US008119087B2

(12) United States Patent
Lee et al.

(10) Patent No.: US 8,119,087 B2
(45) Date of Patent: Feb. 21, 2012

(54) METHOD OF STABLIZING AND SOLIDIFYING ELEMENTAL MERCURY USING SULFUR AND PARAFFIN

(75) Inventors: Tai Gyu Lee, Seoul (KR); Kyung Su Song, Seoul (KR); Yujin Eom, Seoul (KR)

(73) Assignee: Industry Academic Cooperation Foundation, Yonsei University, Seoul (KR)

( * ) Notice: Subject to any disclaimer, the term of this patent is extended or adjusted under 35 U.S.C. 154(b) by 44 days.

(21) Appl. No.: 12/864,722

(22) PCT Filed: Jan. 23, 2009

(86) PCT No.: PCT/KR2009/000378
§ 371 (c)(1), (2), (4) Date: Jul. 27, 2010

(87) PCT Pub. No.: WO2009/096688
PCT Pub. Date: Aug. 6, 2009

(65) Prior Publication Data
US 2010/0312036 A1  Dec. 9, 2010

(30) Foreign Application Priority Data
Jan. 28, 2008 (KR) .................. 10-2008-0008776

(51) Int. Cl.
*A62D 3/30* (2007.01)
*A62D 3/32* (2007.01)
*B01D 53/64* (2006.01)

(52) U.S. Cl. ........ 423/210; 588/313; 588/314; 588/252; 588/404

(58) Field of Classification Search .................. 423/210; 588/313, 314, 404, 252
See application file for complete search history.

(56) References Cited

U.S. PATENT DOCUMENTS
| | | |
|---|---|---|
| 6,399,849 B1 | 6/2002 | Kalb et al. |
| 6,547,712 B1 | 4/2003 | Ikari et al. |
| 2010/0312036 A1 * | 12/2010 | Lee et al. ........ 588/313 |

FOREIGN PATENT DOCUMENTS
JP  60-078683 A  5/1985
JP  03-039427 A  2/1991

OTHER PUBLICATIONS

International Search Report and Written Opinion, prepared by the Korean Intellectual Property Office, acting as International Searching Authority, for international patent application No. PCT/KR2009/000378, completed Aug. 13, 2009, and mailed Aug. 14, 2009, 6 pages.

* cited by examiner

*Primary Examiner* — Timothy Vanoy
(74) *Attorney, Agent, or Firm* — Swanson & Bratschun, L.L.C.

(57) ABSTRACT

Provided is a method of stabilizing and solidifying elemental mercury using sulfur and paraffin. The method includes reacting elemental mercury with sulfur to prepare a mercury sulfide compound, adding a mixture of the mercury sulfide compound and the remaining sulfur after the reaction to high-temperature liquid paraffin to melt the remaining sulfur, and cooling the sulfur to solidify the mercury sulfide compound. According to the method of stabilizing and solidifying elemental mercury using sulfur and paraffin, a surface of a solidified product is covered with a thin paraffin layer to prevent exposure to the outside.

11 Claims, 1 Drawing Sheet

US 8,119,087 B2

METHOD OF STABLIZING AND SOLIDIFYING ELEMENTAL MERCURY USING SULFUR AND PARAFFIN

CROSS-REFERENCE TO RELATED APPLICATIONS

This application is a 35 USC §371 of PCT Application Serial No. PCT/KR2009/000378, filed Jan. 23, 2009, currently pending, entitled "Method of Stablizing and Solidifying Elemental Mercury Using Sulfur and Paraffin," which claims priority to Korean Patent Application No. 10-2008-0008776, filed Jan. 28, 2008, entitled "Method of Stablizing and Solidifying Elemental Mercury Using Sulfur and Paraffin," which are each incorporated herein in their entirety by reference.

TECHNICAL FIELD

The present invention relates to a method for stabilizing and solidifying elemental mercury using sulfur and paraffin, and more particularly, a method for stabilizing and solidifying elemental mercury using sulfur and paraffin, including preparing a mercury sulfide compound by reaction of elemental mercury with sulfur, adding a mixture of the mercury sulfide compound and remaining sulfur after the reaction to high-temperature liquid paraffin to melt the remaining sulfur, and cooling the remaining sulfur and solidifying the elemental mercury. According to the method, a thin paraffin layer is formed on a surface of the solidified product to prevent exposure to the outside.

BACKGROUND ART

Though use of elemental mercury (Hg) is industrially and commercially regulated, since hazardous waste continues to be generated, research on hazardous waste treatment methods should go on. The U.S. environmental protection agency designates a method of treating mercury according to Land Disposal Restriction (LDR) regulations and then disposing of it in a landfill.

Mercury is an element which can not be decomposed, but it may be transformed into another form that is least harmful to the environment after disposal. Examples of mercury waste include elemental mercury, and solids, waste, soil, deposits and sludge contaminated by mercury.

Elemental mercury collected from mercury waste reacts with sulfur to produce fine mercury sulfide (HgS) powder, which has a melting point of 583.5° C. and a very low solubility of $2.0 \times 10^{-49}$. However, since it is impossible to dispose of the powdery mercury sulfide or to store it due to risk of dispersion, it has been stored in air-tight containers or disposed of after being hardened using a solidifying agent (e.g., cement). Generally, elemental mercury reacts with a large amount of sulfur for reacting more rapidly. Conventional art uses sulfur that has an about 6-fold higher molar ratio and the same weight as elemental mercury. After reaction, a mixture of mercury sulfide (HgS) and remaining sulfur are left over. Since the remaining sulfur is difficult to separate from the mercury sulfide (HgS), in the conventional art, a mixture itself thereof was solidified with cement and then disposed of, and therefore, the waste mixture has significantly increased weight and volume. When mercury melts in a liquid, mercury sulfide (insoluble material) can be prepared using sulfur or sulfide and separated by filtering so that the mercury sulfide can be isolated for solidification. However, it is very difficult to induce direct reaction of elemental mercury which is collected from solid waste using thermal extraction and condensed, with sulfur, and then separate the elemental mercury from the sulfur for solidification.

Another method for disposal of elemental mercury is a method using sulfur polymer cement (SPC). SPC is a thermoplastic material consisting of 95 wt % elemental sulfur, 5 wt % organic modifiers, dicyclopentadiene and oligomers of cyclopentadiene. SPC melts at about 120° C. and then is solidified by cooling at below the temperature.

According to the method using SPC, firstly, SPC having a size capable of passing through a 60-mesh sieve is prepared using a ball mill and then reacts with elemental mercury. Subsequently, a large amount of the SPC reacts with the elemental mercury to form a mercury sulfide compound. Then, the compound is heated up to 120° C. Accordingly, the compound completely melts into a liquid, and then a hard solidified product is prepared by cooling the melted compound. Here, for further stabilization, a small amount of sodium sulfide nonahydrate ($Na_2S \cdot 9H_2O$) may be added. SPC is generally harder and more stable than cement, so it represents excellent physical characteristics. However, SPC is a patented material which can only be obtained under license.

Thus, development of a novel treatment method to stabilize and (or) solidify elemental mercury is a matter of urgency, considering the need for original technology and export of the same.

DISCLOSURE OF INVENTION

Technical Problem

The present invention is directed to a remarkable novel method of stabilizing and solidifying elemental mercury using sulfur, without using conventional SPC.

Technical Solution

In one aspect, the present invention provides a method of stabilizing elemental mercury, including: reacting elemental mercury obtained from waste with sulfur to prepare a mercury sulfide (HgS) compound and remaining sulfur; adding the mercury sulfide compound and the remaining sulfur to paraffin to melt the remaining sulfur; and cooling the melted mixture to solidify the mercury sulfide compound with the remaining sulfur.

BRIEF DESCRIPTION OF DRAWINGS

These and/or other objects, aspects and advantages of the invention will become apparent and more readily appreciated from the following description of exemplary embodiments, taken in conjunction with the accompanying drawings, in which.

BEST MODE FOR CARRYING OUT THE INVENTION

Figure 1:
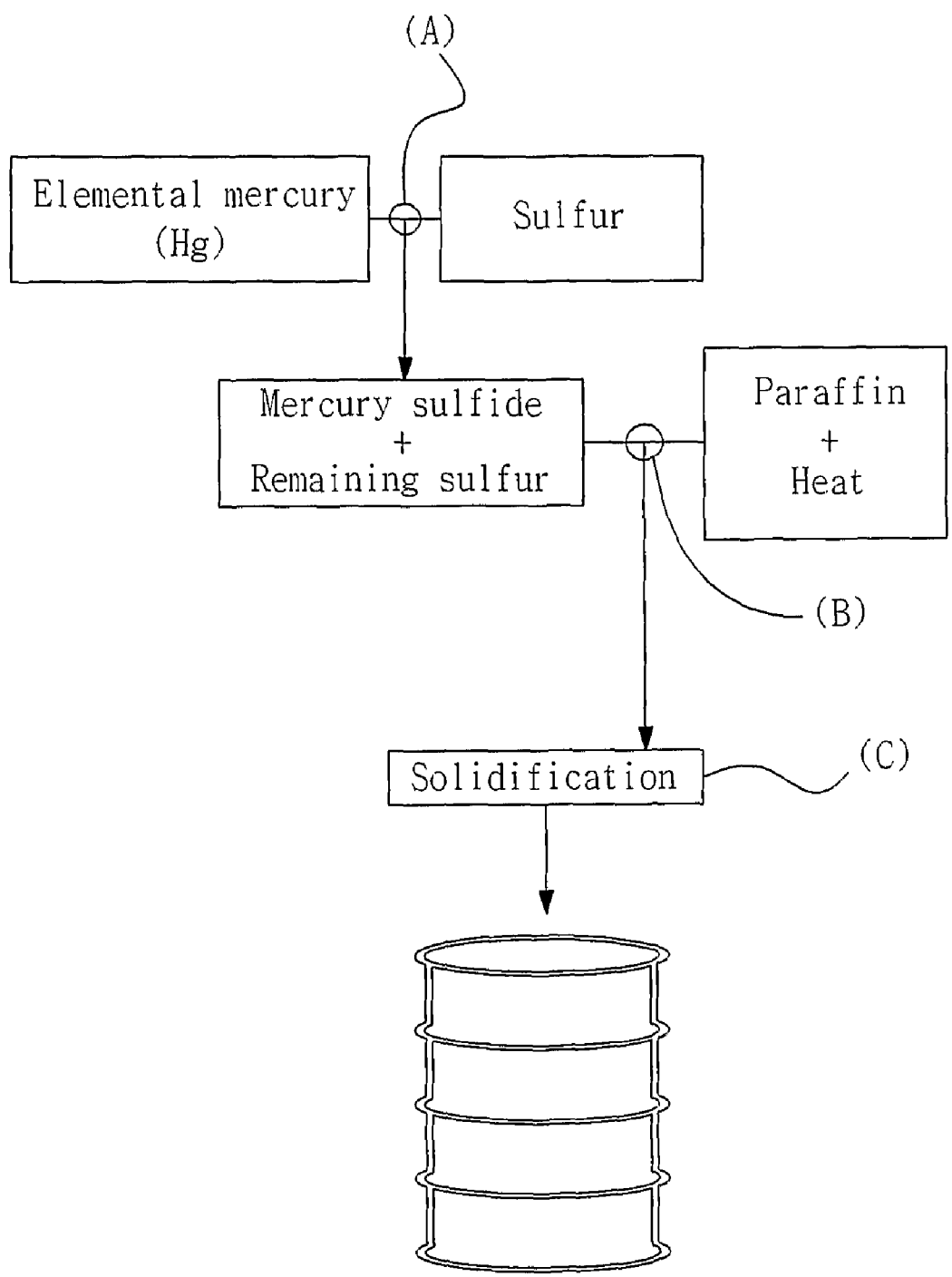
FIG. 1 is a schematic view illustrating a method of stabilizing and solidifying elemental mercury according to the present invention.

The constitution of the present invention will now be described in detail.

The present invention relates to a method of stabilizing elemental mercury, including: (A) reacting elemental mercury obtained from waste with sulfur to prepare a mercury sulfide (HgS) compound and remaining sulfur; (B) adding the mercury sulfide compound and remaining sulfur obtained in the above step (A) to paraffin to melt the remaining sulfur; and (C) cooling the obtained mixture from the above step (C) to solidify the mercury sulfide compound with the remaining sulfur.

Mode for the Invention

The method of stabilizing elemental mercury can stabilize and solidify the elemental mercury using only sulfur without SPC. Commercially available sulfur is generally prepared in a yellow powdery form but becomes a liquid at 115.21° C. Thus, the method of stabilizing elemental mercury according to the present invention uses sulfur powder.

The method of stabilizing elemental mercury of the present invention is schematically illustrated in FIG. 1.

The first step (A) is to prepare a mercury sulfide (HgS) compound by reaction of elemental mercury obtained from waste with sulfur.

The content of sulfur used is not particularly limited, but is preferably 0.5 to 3 parts by weight, and more preferably 1 to 2.5 parts by weight for 1 part by weight of elemental mercury, in order to increase the hardness of the solidified product.

Further, in preparation, a mercury oxide stabilizer may be added in the step (A) reacting the elemental mercury with the sulfur to further stabilize the mercury sulfide compound.

Since stabilized elemental mercury exists in an equilibrium state of $Hg^0 \leftrightarrow Hg^{2+}$, i.e., since element mercury is oxidized into $Hg^{2+}$, the stabilizer is added for stabilization of the elemental mercury.

The mercury oxide stabilizer may include, but is not particularly limited to, sodium sulfide nonahydrate ($Na_2S.9H_2O$).

The content of mercury oxide stabilizer used is not particularly limited, but is preferably 0.5 to 2.5 parts by weight for 10 parts by weight of elemental mercury.

A method of adding the stabilizer may include, but is not particularly limited to, a) reacting sulfur with elemental mercury to prepare a mercury sulfide mixture, and b) adding a mercury oxide stabilizer to the mixture for further reaction. Specifically, in step a), sulfur and elemental mercury are put into a vial and reacted for 4 to 8 hours in a constant temperature oven at 70 to 80° C. After that, in step b), the above-mentioned content of mercury oxide stabilizer is added and the mixture is further reacted for 2 to 4 hours in the constant temperature oven, thereby obtaining a red mercury sulfide (HgS) compound.

The second step (B) is performed to add the mercury sulfide compound and remaining sulfur obtained in the first step (A) to paraffin and melt the remaining sulfur.

The paraffin used in the second step (B) has a melting point of 47 to 95° C. and a heating point of 160 to 250° C. The powdery mixture of the mercury sulfide (HgS) compound and sulfur is difficult to gradually heat and may generate gas such as HgO and $SO_2$ when reaction is not performed in a reactor filled with nitrogen or argon gas, resulting in risk of powder dispersion. On the other hand, when the remaining sulfur is melted using the paraffin at a gradually increasing temperature, generation of gas may be prevented and thus risk in the process can be minimized.

In addition, when the sulfur is melted using the paraffin at a gradually increasing temperature and then cooled, the sulfur is hardened but the paraffin having a lower melting point still remains in a liquid state. Subsequently, the paraffin is transferred to a different reaction vessel for recycling in a subsequent process, which is very economical.

The method of carrying out the second step (B) may include, but is not particularly limited to, c) applying heat to the paraffin to prepare liquid paraffin, and d) adding the mercury sulfide compound and the remaining sulfur to the liquid paraffin to melt the remaining sulfur.

That is, a method and order of mixing the mercury sulfide compound, the remaining sulfur and the paraffin is not particularly limited, but addition of the mercury sulfide compound and the remaining sulfur to the high-temperature liquid paraffin is preferable for uniform heat transmission.

As described above, when a preferable amount of paraffin is put into a reaction vessel and melts into liquid, and the stabilized mixture of the mercury sulfide compound and the remaining sulfur obtained from the first step (A) is put thereinto, the powdery mixture in the paraffin first melts into liquid and then settles at the bottom of the reaction vessel as the temperature gradually goes up. Accordingly, two layers are generated in the reaction vessel: a top layer of paraffin and a bottom layer of liquid sulfur.

Melting the mixture of the mercury sulfide compound and the remaining sulfur into liquid may be performed at 120 to 180° C.

Further, before step d), additional step e) of adding sulfur to the liquid paraffin may be included. That is, before step d) of adding the mixture of the mercury sulfide compound and the remaining sulfur to the liquid paraffin, a step of adding extra sulfur to the liquid paraffin may be included. When the mixture of the mercury sulfide compound and the remaining sulfur is added right after the additional sulfur is converted into a liquid state, solidification efficiency may be improved. Here, the content of extra sulfur added to the liquid paraffin may be, but not is particularly limited to, 0.5 to 1.5 parts by weight for 1 part by weight of the elemental mercury added in the first step (A).

The third step (C) is to cool the melted mixture obtained from the second step (B) to solidify the mercury sulfide compound using the remaining sulfur.

After the mixture obtained from the second step (B) is divided into two layers, it is cooled. Accordingly, the melted sulfur is abruptly hardened and solidified with the mercury sulfide, but the paraffin is slowly hardened due to its low melting point. In addition, during solidification, the mixture obtained from the second step (B) may be hardened as is, or a certain amount of the paraffin may be removed before hardening. Moreover, liquid paraffin collected before hardening may be recycled in a subsequent process. The solidified product prepared according to the process may have a Mohs hardness of 2 to 2.5, which is between plaster and calcite. Thus, the solidified product is covered with a thin paraffin layer and then safely stored or disposed of.

The mercury sulfide (HgS) compound prepared according to the method of the present invention, whose color may be black, or red when a stabilizer is added, is prepared by the reaction of elemental mercury with sulfur as described above. The mercury sulfide compound is possibly disposed in a solidified state according to the method described above, but may be disposed in a state having greater hardness and the smallest contact area with the outside, in which case an additional step is needed to cover an external surface of the solidified compound with cement. Here, mixing activated carbon coated with $CS_2$ or ash with the cement is preferable.

A method of pretreating the activated carbon or ash with $CS_2$ may include, but is not is particularly limited to, immersing ash or activated carbon in the $CS_2$ solution, filtering the resulting solution, and drying it with heat. The entire process of the experiment is preferably conducted in a hood.

The activated carbon may be economically recycled activated carbon.

Hereinafter, the present invention will be described in detailed with reference to examples.

However, the following examples are provided only to explain the present invention and not to restrict its scope.

EXAMPLE 1

Preparation of Solidified Elemental Mercury 15.46 g of sulfur and 1 ml of elemental mercury (about 13.56 g) were put into a vial which was then closed and sealed with a cap. Subsequently, the vial was shaken several times to mix the sulfur with the mercury, thereby obtaining a black mercury sulfide (HgS) compound. The HgS compound and remaining sulfur after the reaction were put into a constant temperature oven and heated at 75° C. for about 6 hours.

The bottle (vial) was put on a hot plate and heated to stabilize the mercury sulfide compound, and enough paraffin was then added to completely immerse the compound therein. The bottle was heated at 130° C., thereby preparing liquid paraffin. The stabilized mercury sulfide compound and the remaining sulfur were added to the liquid paraffin and heated to melt the mercury sulfide compound and the remaining sulfur into liquid. Then, the bottle was transferred from the hot plate to cool the liquid mercury sulfide compound and remaining sulfur, thereby preparing a solidified product.

EXPERIMENTAL EXAMPLE 1

Acid-Leaching Test of Solidified Product and Paraffin 0.491 g of the solidified product was taken from 27.58 g thereof (excluding paraffin) prepared in Example 1 for an acid-leaching test.

The acid-leaching test was carried out according to the EPA 7471B method suggested by the U.S. Environmental Protection Agency (EPA). This method, which can measure total concentration of organic and inorganic mercury, is used to estimate mercury in solid and semisolid waste.

According to the method, mercury in the stabilized solidified product may also be analyzed, after it is completely melted.

First, a part of a waste sample (about 0.5 g) to be analyzed was taken and put into a closed vessel for acid-leaching. 5 ml of sulfur, 2 ml of nitric acid and 5 ml of a 5% potassium permanganate were also added. After closing it with a cap, the vessel was put into a microwave to completely melt the sample into liquid at high temperature and high pressure. The liquid sample was analyzed to measure a mercury concentration in the solid, and the concentration was expressed in units of w/w.

The acid-leached solution was 1000-fold diluted twice to fall within the range of the Rumax Mercury Analyzer. In addition, the acid-leaching test was performed on the paraffin separated in advance during cooling according to the method described above. The resulting solution obtained by acid-leaching the paraffin was 1000-fold diluted once to fall within the range of the analyzer, and the analysis results are shown in Tables 1 and 2 (acid-leaching results of the solidified product and paraffin, respectively).

TABLE 1

| Sample (Solidified Product) | Mercury Concentration (g/g) |
|---|---|
| 1 | 0.472912 |
| 2 | 0.483910 |
| 3 | 0.487576 |
| Average | 0.480244 |

TABLE 2

| Sample (Paraffin) | Mercury Concentration (mg/g) |
|---|---|
| 1 | 0.195955 |
| 2 | 0.190969 |
| 3 | 0.195955 |
| Average | 0.193961 |

As shown in Tables 1 and 2, 13.24 g (0.480244 g/g×27.58 g) of a material resin was solidified in the solidified product, and 10.42 mg (0.193961 mg/g×53.73 g) thereof was solidified in paraffin. In other words, 13.56 g of elemental mercury is used in preparation of the mercury sulfide compound, and 13.24 g thereof was solidified in the solidified product and 10.42 mg thereof was solidified in the paraffin. From the results, it was confirmed that almost all of the elemental mercury was solidified.

EXPERIMENTAL EXAMPLE 2

Elution Test of Solidified Product and Paraffin

The test was carried out according to the method described in Experimental Example 1, except that, in order to identify a more precise reaction ratio (weight ratio) of sulfur to mercury, various amounts of sulfur were added for repeated testing. In addition, an elution test for each of the solidified product and paraffin was performed according to a Toxicity Characteristic Leaching Procedure (TCLP).

The prepared solidified product was crushed into small pieces and all of the pieces were immersed in a TCLP elution test solution with a ratio of 1:20 (Solidified product:Eluted solution) for 18-hour elution.

16.46 g of the paraffin was taken for the elution test by the method described above. Analysis of the elution test solution was carried out using a Rumax Mercury Analyzer, and the analysis results are shown in Tables 3, 4, 5 and 6.

EXAMPLE 2

1 ml of elemental mercury (about 13.56 g) reacted with sulfur (13.56 g) having the equivalent weight of the elemental mercury and the resulting product was solidified as described in Experimental Example 1, thereby preparing 26.227 g of a solidified product. The solidified product was eluted according to TCLP, thereby obtaining the following results shown in Table 3.

TABLE 3

| Sample (Solidified Product) | Concentration (μg/L) |
|---|---|
| 1 | 35.4 |
| 2 | 35.6 |
| 3 | 33.8 |
| Average | 34.9 |

EXAMPLE 3

1 ml of elemental mercury (about 13.56 g) reacted with twice that weight of sulfur (27.12 g) and the resulting product was solidified as described in Experimental Example 1, thereby preparing 40.237 g of a solidified product. The solidified product was eluted according to TCLP, thereby obtaining the following results shown in Table 4.

TABLE 4

| Sample (Solidified Product) | Concentration (μg/L) |
|---|---|
| 1 | 27.1 |
| 2 | 27.6 |
| 3 | 26.1 |
| Average | 26.9 |

It can be confirmed from Table 4, the elution concentration was lower in Example 3 using the twice the amount of sulfur than in Example 2 using an equivalent amount of sulfur.

EXAMPLE 4

Sodium sulfide nonahydrate ($Na_2S \cdot 9H_2O$) was added to a mercury sulfide compound and remaining sulfur as a stabilizer to further stabilize elemental mercury, and a TLCP elution test was performed.

More specifically, 1 ml of elemental mercury (about 13.56 g) reacted with an equivalent weight of sulfur (13.56 g) for 6 hours, and then 2 g of $Na_2S \cdot 9H_2O$ was added. The reaction was carried out for 3 more hours to further stabilize the elemental mercury.

For solidification, 13.56 g of sulfur was additionally mixed with liquid paraffin that had been heated in advance to melt it into liquid sulfur, and the stabilized mercury sulfide compound and remaining sulfur were added thereto, thereby finally obtaining 43.112 g of a solidified product.

The TCLP elution test was performed on the solidified product, obtaining the following results shown in Table 5.

TABLE 5

| Sample (Solidified Product) | Concentration (ng/L) |
|---|---|
| 1 | 0 |
| 2 | 0 |
| 3 | 11 |
| Average | 3.6 |

Table 5 shows that the solidified product was eluted at a very low concentration of 3.6 ng/L on average. As a result, it was confirmed that a red mercury sulfide compound prepared by adding a stabilizer is more stable than a black mercury sulfide compound.

Meanwhile, the TLCP elution test results for paraffin are shown in Table 6. As shown in Table 6, almost no mercury was detected from the paraffin.

TABLE 6

| Sample (Paraffin) | Concentration (ng/L) |
|---|---|
| 1 | 9.2 |
| 2 | 5.7 |
| 3 | 15 |
| Average | 7.7 |

COMPARATIVE EXAMPLE 1

Comparison of Hardness with Cement Solidified Product 13.56 g of elemental mercury reacted with an equivalent weight of sulfur (13.56 g) and the resulting product was hardened with 13.56 g of cement. The total weight of the materials used herein was 40.68 g, which is the same as in Example 3.

The solidified product was not hardened enough and crumbled, and a stabilized mercury sulfide (HgS) compound crumbled into powder. Compared with the results shown in Example 3, the solidified product stabilized and solidified with twice the amount of sulfur as elemental mercury hardened firmly, but the solidified product stabilized with the same amount of sulfur as elemental mercury and then solidified with the same amount of cement as sulfur used had significantly lower hardness. As a result, it was confirmed that when elemental mercury is mixed with cement for solidification, a larger amount of cement is required than when only sulfur is used.

According to the present invention, stabilization and solidification of elemental mercury is carried out by sulfur and paraffin, which is economical. Moreover, the elemental mercury can be stored and safely disposed of.

Due to its low melting point, paraffin covering an external surface of a solidified product can be collected in a liquid state for recycling in a subsequent process after sulfur and mercury sulfide have been solidified during cooling.

The solidified product according to the present invention has a medium level of hardness between plaster and calcite, that is, a Moh s hardness of 2 to 2.5. It can be prepared from readily available materials and solidified again with general cement for greater hardness. Further, in the additional solidification using cement, only an external surface of the solidified product is covered with cement to minimize an area in contact with the outside, so that the volume of the solidified product can be reduced compared with a conventional method of entirely solidifying elemental mercury with cement.

While exemplary embodiments of the present invention have been shown and described, it will be appreciated by those skilled in the art that various changes can be made to the described exemplary embodiments without departing from the spirit and scope of the invention defined by the claims and their equivalents.

The invention claimed is:

1. A method of stabilizing elemental mercury, comprising:
   (A) reacting elemental mercury obtained from waste with sulfur to prepare a mercury sulfide compound and remaining sulfur;
   (B) adding the mercury sulfide compound and the remaining sulfur to paraffin to melt the remaining sulfur; and
   (C) cooling the melted mixture to solidify the mercury sulfide compound with the remaining sulfur.

2. The method according to claim 1, wherein a content of the sulfur reacting with the elemental mercury is 0.5 to 3 parts by weight for 1 part by weight of the elemental mercury.

3. The method according to claim 1, further comprising: adding a mercury oxide stabilizer in the step (A) reacting the elemental mercury with the sulfur.

4. The method according to claim 3, wherein the mercury oxide stabilizer is sodium sulfide nonahydrate.

5. The method according to claim 3, wherein a content of the mercury oxide stabilizer added is 0.5 to 2.5 parts by weight for 10 parts by weight of the elemental mercury.

6. The method according to claim 1, wherein the step (A) comprises:
   a) reacting sulfur with elemental mercury to prepare a mercury sulfide mixture; and
   b) adding a mercury oxide stabilizer to the mixture and further reacting the resulting mixture.

7. The method according to claim 1, wherein the step (B) comprises:
   c) applying heat to the paraffin to prepare liquid paraffin; and
   d) adding the mercury sulfide compound and remaining sulfur to the liquid paraffin to melt the remaining sulfur.

8. The method according to claim 7, wherein the step d) is performed at 120 to 180° C.

9. The method according to claim 7, further comprising: before the step d),
   e) adding sulfur to the liquid paraffin.

10. The method according to claim 9, wherein a content of the sulfur added to the liquid paraffin before step d) is 0.5 to 1.5 parts by weight for 1 part by weight of the elemental mercury.

11. The method according to claim 1, further comprising: solidifying the result obtained from the step (C) with cement.

* * * * *